(No Model.)
J. H. MITCHELL.
PROCESS OF TREATING CAKES, &c.
No. 447,966. Patented Mar. 10, 1891.
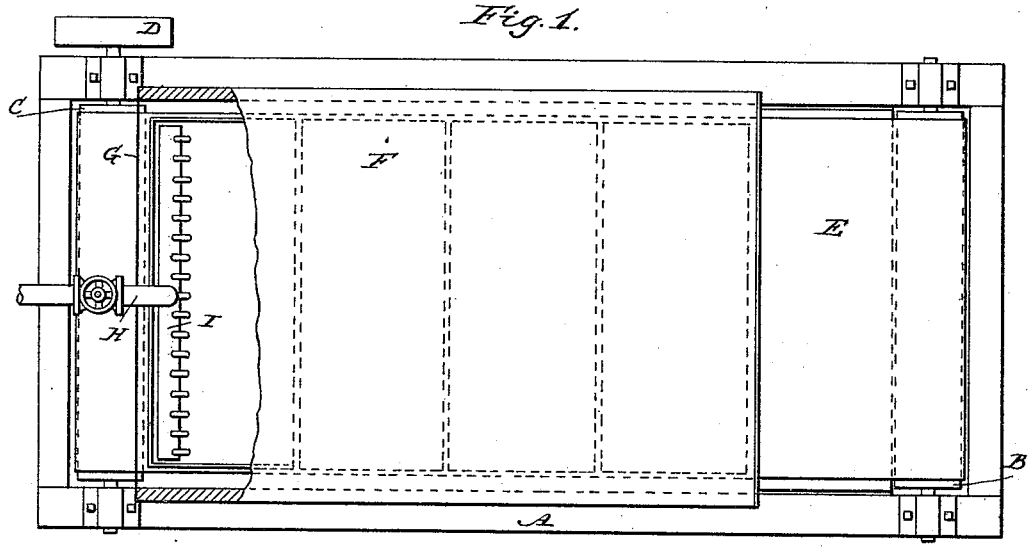
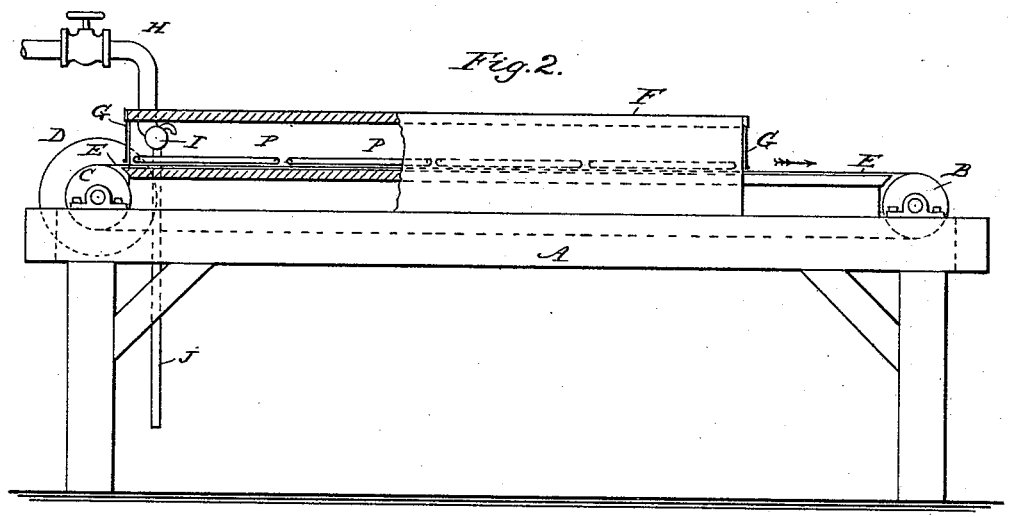
WITNESSES:
INVENTOR
ATTORNEY

UNITED STATES PATENT OFFICE.

JAMES HENRY MITCHELL, OF PHILADELPHIA, PENNSYLVANIA.

PROCESS OF TREATING CAKES, &c.

SPECIFICATION forming part of Letters Patent No. 447,966, dated March 10, 1891.

Application filed June 11, 1890. Serial No. 355,059. (No specimens.)

*To all whom it may concern:*

Be it known that I, JAMES HENRY MITCHELL, a citizen of the United States, residing at Philadelphia, in the county of Philadelphia and State of Pennsylvania, have invented new and useful Improvements in the Process of Treating Cakes, &c., of which the following is a specification.

My invention relates especially to the treatment of cakes, crackers, and similar products after baking, and has for its object the treatment of the product in such a manner as to prevent the usual cracking, breaking and consequent waste which have heretofore taken place. This cracking and breaking arises from the fact that when a cake, cracker, biscuit, or other similar product is baking the edge or periphery, being more exposed to the heat of the oven than the top and bottom, dries out completely, while the center of the cake remains moist to a certain extent, even when completely baked, and when removed from the oven the center of the cake continues to dry out, and as contraction takes place toward the periphery, already thoroughly dry, the center of the cake cracks, and a final complete rupture often takes place, destroying the appearance of the cake, and consequently impairing its value.

I subject the cakes or equivalent product immediately upon removing from the oven and while warm to a bath of low steam or fine spray, moistening the same, particularly at its edge, where the moisture will be most quickly absorbed, and then permitting the cake to dry and cool in the ordinary atmosphere before packing. By this means the difficulty of preserving the product in its intact state is overcome, as the cracking produced by the shrinking will not take place.

In the accompanying drawings, illustrating a device whereby my method of treatment may be carried into effect, Figure 1 is a plan view, and Fig. 2 is a side elevation and partial section.

Like letters of reference indicate corresponding parts in both figures.

A is a frame, wherein are journaled rollers B and C, the shaft of roller C being provided with a driving-pulley D.

E is an endless belt passing over the rollers B and C.

F is a chamber mounted above the belt E and provided at each extremity with a flap G.

H is a pipe for supplying steam or water to a spraying device I, said spraying device being provided with a drain-pipe J for drawing off any surplus moisture.

P are pans, shown as resting upon the belt E. I have shown but four pans upon the belt; but the machine and chamber may be made of any desired length in order to subject the cakes to the requisite exposure. As the pans are removed from the oven they are passed onto the traveling belt into the chamber when the steam or fine spray has been admitted, and after remaining there a sufficient time are removed at the opposite end of the machine, and the cakes or other products allowed to cool and dry in the atmosphere before packing in receptacles.

Having now fully described my invention, what I claim as new therein, and desire to secure by Letters Patent, is—

The process of treating cakes, crackers, and similar products, which consists in subjecting the same while warm from the oven to a bath of low-pressure steam or spray.

JAMES HENRY MITCHELL.

Witnesses:
E. J. MCGROGAN,
W. P. ROCHE.